United States Patent
Gurunathan (10) Patent No.: US 10,614,437 B2
(45) Date of Patent: Apr. 7, 2020

(54) METHOD AND SYSTEM FOR POINT OF SALE PAYMENTS

(71) Applicant: MasterCard International Incorporated, Purchase, NY (US)

(72) Inventor: Arunmurthy Gurunathan, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 436 days.

(21) Appl. No.: 15/420,249

(22) Filed: Jan. 31, 2017

(65) Prior Publication Data

US 2017/0228715 A1    Aug. 10, 2017

(30) Foreign Application Priority Data

Feb. 5, 2016 (SG) .......................... 10201600938Y (51) Int. Cl.
| | | |
|---|---|---|
| *G06Q 20/36* | (2012.01) | |
| *G06Q 20/32* | (2012.01) | |
| *G06Q 20/20* | (2012.01) | |
| *G06Q 20/40* | (2012.01) | |

(52) U.S. Cl.
CPC ......... *G06Q 20/202* (2013.01); *G06Q 20/327* (2013.01); *G06Q 20/36* (2013.01); *G06Q 20/4012* (2013.01)

(58) Field of Classification Search
CPC .. G06Q 20/36; G06Q 20/367; G06Q 20/3674; G06Q 20/363; G06Q 20/20; G06Q 20/201; G06Q 20/202; G06Q 20/322; G06Q 20/3278

See application file for complete search history.

(56) References Cited

U.S. PATENT DOCUMENTS

| | | | |
|---|---|---|---|
| 9,576,286 B1 * | 2/2017 | Artman | G06Q 20/3278 |
| 2012/0011009 A1 * | 1/2012 | Lindsey | G06Q 20/20 705/17 |
| 2012/0166333 A1 * | 6/2012 | von Behren | G06Q 20/10 705/41 |
| 2012/0209749 A1 * | 8/2012 | Hammad | G06Q 30/06 705/27.1 |
| 2013/0073365 A1 * | 3/2013 | McCarthy | G06Q 20/02 705/14.23 |
| 2014/0207682 A1 * | 7/2014 | Wolfond | G06Q 20/027 705/44 |
| 2015/0339670 A1 * | 11/2015 | Shaked | H04L 9/3228 705/44 |
| 2016/0092880 A1 * | 3/2016 | Klingen | G06Q 20/42 705/16 |
| 2016/0232518 A1 * | 8/2016 | Butler, IV | G06Q 20/367 |

\* cited by examiner

*Primary Examiner* — Suezu Ellis (74) *Attorney, Agent, or Firm* — Buckley, Maschoff & Talwalkar LLC (57) ABSTRACT

A method of performing a point of sale (POS) payment transaction at a merchant location, the method including, in one or more electronic processing devices: (a) receiving a transaction request including an indication of a transaction identifier from the user device; (b) retrieving an indication of payment information from a merchant system using the transaction identifier; (c) requesting user account information from the user device; (d) receiving the user account information in response to user input; and (e) initiating payment authorization with a payment processing system using the payment information and user account information to enable the payment transaction to be performed.

16 Claims, 9 Drawing Sheets

METHOD AND SYSTEM FOR POINT OF SALE PAYMENTS

CROSS-REFERENCE TO RELATED APPLICATION

This application is a U.S. National Stage filing under 35 U.S.C. § 119, based on and claiming benefit of and priority to SG Patent Application No. 10201600938Y filed Feb. 5, 2016.

BACKGROUND OF THE INVENTION

The present invention relates to electronic payments between a consumer and a merchant and in particular to a method and system for performing a point of sale (POS) payment transaction at a merchant location.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Payment transactions that occur at a POS location typically require a consumer to pay for goods and/or services using cash or by a payment card such as a credit, debit or gift card. In the case of payment by card, a physical card is required to be presented to a merchant POS machine which is capable of receiving electronic data associated with the financial account linked to the card in order to effect payment for the goods or services.

POS machines may acquire the card information in a number of different ways. In one example, the card information is stored in a magnetic stripe which is transferred to the POS machine by swiping the card past a magnetic reading head. Other types of payment cards contain an electronic chip (known as EMV cards-Europay, Mastercard, Visa) which are dipped into a chip reader of the POS machine in order to effect payment. EMV cards are considered more secure than magnetic stripe cards because every time they are used for payment, the card chip creates a unique transaction code that cannot be used again unlike magnetic stripes that contain unchanging data. Finally, some payment cards permit contactless payment with a POS machine by using radio-frequency identification (RFID) or near field communication (NFC) technologies. Contactless payment may enable transactions to be processed faster as the consumer is usually able to pay for goods or services under a certain value without traditional methods of authentication such as providing a PIN number or signature.

The problem with the above methods of payment however is that a physical card must always be presented at the location of the POS machine. This often leads to inefficient processing of transactions as consumers may be required to join a queue and wait to be able to pay for their goods or services. This can be a frustrating experience for the consumer particularly if the merchant is busy and there is a long queue at the payment counter for example in a retail, supermarket or grocery store environment. In a café or restaurant environment, to complete a payment transaction, a waiter will often provide the bill to the consumer at their table. The consumer may then provide their payment card to the waiter who then goes to a POS machine and processes the transaction before returning the card and a receipt to the customer. This is an inefficient process and often takes a long time particularly when multiple waiters are trying to settle different accounts at the same time. Such delays are typically undesirable for the customer and may be time consuming and costly for the merchant due to the potential inability to process transactions quickly and turnover tables.

In other environments, such as a train or bus station, consumers often have to queue for ticket machines which accept payment by cash or card. This is also inefficient and time consuming when a station is busy or the consumer is running short of time and wanting to catch the next bus or train.

Furthermore, in the above examples, the actual goods or services being purchased are typically remote from the centralized POS location. The consumer is therefore required to obtain their goods for example in a retail store or supermarket and then navigate their way to the nearest POS location in order to execute payment for the goods. In a large retail or department store, sometimes having multiple floors, it can be inconvenient to have to firstly find the nearest POS location and then to wait for a server or in a queue to make payment.

In the example of a carpark, a ticket is usually obtained on entry to the car park and must be validated at a ticket machine before exiting the car park. Typically, the ticket machine is not located in close proximity to the car parking space. Again, queuing up is a common problem that consumers face as well as the need to present at the ticket machine before returning to their car.

It is generally desirable to improve consumer experiences with making payments for goods and services. It is also generally desirable to improve merchant experiences with making payments.

It is against this background, and the problems and difficulties associated therewith, that the present invention has been developed.

SUMMARY

There is provided a method of performing a point of sale (POS) payment transaction at a merchant location, the method including, in one or more electronic processing devices: receiving a transaction request including an indication of a transaction identifier from a user device; retrieving an indication of payment information from a merchant system using the transaction identifier; requesting user account information from the user device; receiving the user account information in response to user input; and, initiating payment authorization with a payment processing system using the payment information and user account information to enable the payment transaction to be performed.

Preferably, the one or more electronic processing devices communicate with the user device via a wireless communication protocol, and communication between the one or more electronic processing devices and the user device is encrypted.

The method can further include, in the one or more electronic processing devices: causing a user interface to be displayed on the client device; and, receiving the indication of the transaction identifier via the user interface. The user interface can preferably be a webpage or an application executing on the user device. The transaction identifier can include at least one of: information indicative of goods or services being purchased by the user; a product or service purchase code; a product or service reference number; and;

a travel location. The user account information can be received from the user via input into the user interface displayed on the user device.

In the method, in response to receiving the indication of the transaction identifier, the method can further include, in the one or more electronic processing devices: providing the transaction identifier to the merchant system, the merchant system being responsive to the transaction identifier to: determine payment information including at least one of: a payment amount; an indication of at least one of goods and services being purchased; a bill; and, a ticket; and, provide the payment information to the one or more electronic processing devices; and, receiving an indication of the payment information from the merchant system.

The method can further include providing the indication of the payment information to the user device, the user device being responsive to the payment information to: display a representation of the payment information to the user; and, determine acceptance of the payment information in accordance with user input commands.

The method can also include, in the one or more electronic processing devices: determining whether a digital wallet application is installed on the user device; and, in accordance with the determination either: requesting access to the digital wallet application in order to retrieve user account information; or, requesting that the user input account information via the user interface.

In addition, the method can further include, in the one or more electronic processing devices: sending a request to the user device to access a digital wallet application installed on the user device in order to retrieve user account information, the user device being responsive to the request to selectively provide user account information to the one or more electronic processing devices; and, receiving user account information from the user device. Preferably, the digital wallet application is configured to authenticate the user to selectively provide the user account information.

It is preferable that the digital wallet application: prompts the user to provide authentication information; selectively authenticates the user using the authentication information; and, provides access to the user account information in response to successful authentication. The authentication information can include a PIN number associated with the digital wallet application.

Preferably, in response to successful payment authorization, the method further includes, in the one or more electronic processing devices, providing an indication to the user device that the payment transaction is complete, the user device being responsive to display a representation of transaction completion.

Furthermore, the method can also include, in the one or more electronic processing devices: generating a digital payment record indicative of the completed transaction; and, providing the digital payment record to the user device. The digital payment record can include at least one of: a digital receipt; and, a digital ticket.

There is also provided a system for performing a point of sale (POS) payment transaction at a merchant location, the system including one or more electronic processing devices that: receive a transaction request including an indication of a transaction identifier from the user device; retrieve an indication of payment information from a merchant system using the transaction identifier; request user account information from the user device; receive the user account information in response to user input; and, initiate payment authorization with a payment processing system using the payment information and user account information to enable the payment transaction to be performed.

In another aspect, there is provided a system for performing a point of sale (POS) payment transaction at a merchant location, the system including a POS device capable of establishing a wireless connection with a user device, the POS device configured to: receive a transaction request including an indication of a transaction identifier from a connected user device, the transaction identifier indicative of goods or services being purchased by the user from a merchant; retrieve an indication of payment information from a merchant system using the transaction identifier; provide the payment information to the user device; request user account information from the user device; receive the user account information from one of: a digital wallet application installed on the client device; and, a web page displayed on the client device; in response to user input; and, initiate payment authorization with a payment processing system using the payment information and user account information to enable the payment transaction to be performed.

Preferably, the POS device is capable of establishing a wireless connection with multiple user devices in order to simultaneously execute multiple payment transactions with the merchant. The POS device can include a wireless router and the wireless connection is established using Wi-Fi or Bluetooth communication protocols.

The user input can include one of: authentication information which selectively provides access to the digital wallet application; and, account information submitted via the web page.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

A non-limiting example of the present invention will now be described with reference to the accompanying drawings, in which:—

DETAILED DESCRIPTION

Figure 1:
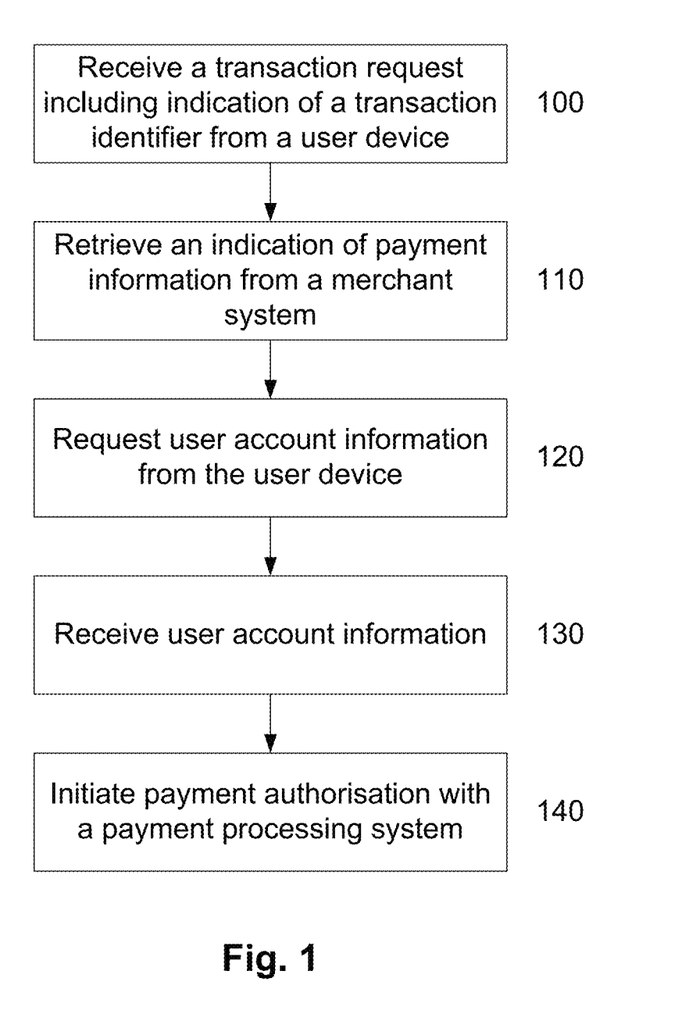
FIG. 1 is a flow chart of an example of a method of performing a point of sale (POS) payment transaction at a merchant location.

An example of a method of performing a point of sale (POS) payment transaction at a merchant location will now be described with reference to FIG. 1.

For the purpose of illustration, it is assumed that the method is performed at least in part using one or more electronic processing devices forming part of a point of sale (POS) device in communication with one or more user devices, such as mobile phones, portable computers, tablet computers, or the like, at a merchant location. The POS device is typically also in communication with a merchant processing system, which may comprise any suitable computer system such as a server, and a payment processing system which may include a number of processing devices associated with each of an issuer, acquirer, card network and payment gateway, or alternatively, the payment processing system may be any one or more of these entities and this will be discussed further below.

In this example, at step 100 the one or more electronic processing devices receive a transaction request including an indication of a transaction identifier from a user device.

In this example, the transaction request represents a user requesting the purchase of goods or services provided by a merchant. The transaction identifier is indicative of the goods or services being purchased and will typically be specific to the merchant supplying the goods or services as will be discussed in more detail below. The transaction identifier is used to identify the current transaction and could be unique to the transaction, or could be associated with the transaction on a temporary basis, for example based on a table number in a restaurant or similar. Typically, the user will provide the transaction identifier via a user interface (UI) displayed on the user device, which may be customised for a particular merchant or be a standard UI provided by a third party such as a card network operator (such as Visa™, MasterCard™, or the like).

Typically, the user device communicates with the one or more electronic processing devices to provide the transaction request via a wireless communications protocol such as Wi-Fi, Bluetooth and the like. In one example, the electronic processing device is configured to provide a wireless hotspot to which the user device may be connected or paired. When the user enters the merchant location and comes within range of the wireless network they will be able to connect or pair with the POS device. Whilst initially the user may request to connect/pair with the POS device, in subsequent visits to the merchant, the connection may be automatically established if the user device has Wi-Fi or Bluetooth enabled that searches for available networks or devices to connect or pair with.

At step 110, the one or more electronic processing devices retrieve an indication of payment information, such as a payment amount, from a merchant system using the transaction identifier. The merchant system typically includes a computer system, POS terminal or the like, and which calculates the payment information and associates this with the transaction identifier during a transaction process, as will be described in more detail below. The payment information can then be retrieved in any suitable manner, such as by having the processing device generate a request, which is supplied to the merchant system, allowing the merchant system to respond with the payment information.

At step 120, the one or more electronic processing devices then requests user account information from the user device. As part of this process, the payment information can be provided to the user device and displayed to the user, allowing the user to confirm that they wish to proceed with the transaction. This can be used to ensure the user has entered the correct transaction identifier and hence is paying the correct amount.

The request for account information can be provided in any suitable manner. For example, if the user has a digital wallet application installed on their user device, the POS device may send a pull message to the user device requesting access to the digital wallet application which stores user account details such as credit card information and the like. Whilst any type of wallet application may be used, such as MasterPass, Apple™ Pay, Google™ Wallet, or the like, in some instances the application is provided by a user's banking institution.

If the user does not have a digital wallet application installed on their user device, the POS device may cause a payment page to be provided (via a browser application, for example) to the user device, prompting the user to provide their account information in order to execute payment of the goods or services being purchased.

At step 130, the one or more electronic processing devices receive the user account information in response to user input. In one example, the user may allow the POS device access to the account information stored in their digital wallet application by authenticating the request with appropriate authentication information such as a PIN number or biometric information (e.g. fingerprint or voice print data) associated with the digital wallet application. If instead the user has been prompted to supply account information via a payment page or the like displayed on their device, then the POS device may receive the user account information as a result of the user manually entering their bank account or card details in the payment UI.

After receiving the user account information, at step 140 the one or more electronic processing devices initiate payment authorization with a payment processing system, using the payment information and user account information to enable the payment transaction to be performed. As previously mentioned, the payment processing system may include a number of processing systems associated with each of an issuer, acquirer, card network and payment gateway, or alternatively, the payment processing system may be any one or more of these entities.

In one example as will be well understood in the art, the POS device sends the user account information and payment information to the merchant's acquirer. The acquirer then requests that the card network get an authorization from the user's issuing bank. The card network submits the transaction to the issuer for authorization and the issuing bank then authorizes the transaction if the account has sufficient funds to cover the amount payable. The issuer then routes payment to the acquirer who then deposits the payment into the merchant's account.

The abovementioned example therefore provides a method of performing a POS transaction between a customer and a merchant without requiring the customer to present a physical card at a POS terminal. Instead, the transaction is facilitated by one or more processing devices, which optionally form part of a physically distinct POS device, which may be separate to a POS terminal, but which can provide the necessary connectivity to allow interaction with a user device and other systems as required, allowing users to perform transactions directly using their own user device.

Accordingly, the above described method provides a number of advantages.

As the customer is not required to present a physical card at a POS terminal, a payment transaction may be executed from anywhere at a merchant location (i.e. "pay from where you are"). This provides a more convenient way of paying for goods or services avoiding the need for consumers to go to a payment counter or checkout to make payment where a traditional POS system is located. The time taken to execute payment may therefore be reduced as queuing is eliminated and the merchant employee is taken out of the payment process. Unlike traditional POS systems where only a single customer transaction can be performed at any time, the above described method allows multiple customer transactions to be handled simultaneously which provides a more efficient and streamlined shopping experience. From the merchant's perspective, this allows more transactions to be processed which may lead to increased turnover and profit.

Additionally, removing the need to use a physical bank card at a POS terminal enables a more secure payment transaction to be performed as the customer is not required to share a physical card or other payment device at the POS terminal (as is traditionally done using swipe, dip or contactless technologies) and does not need to enter a PIN on the POS terminal. Furthermore, user account information is not required to be shared with the merchant as the POS device handles the entire transaction with the payment processing system.

In some examples, the method may further enhance customer experience by providing a customized user interface (e.g. payment page) for the merchant that the user can interact with in order to submit transaction requests and/or provide payment information. As will be described in further detail below, the method may additionally provide digital receipts or tickets to the user device which is more convenient than receiving paper receipts or tickets which may get lost or misplaced.

A number of further features will now be described.

In one example, the one or more electronic processing devices communicate with the user device via a wireless communication protocol as previously mentioned. Whilst typically Wi-Fi and Bluetooth protocols will be used, any other suitable wireless protocol may be used at a given merchant location to facilitate communication and transfer of data between the POS device and the one or more user devices. In one example, the merchant may have their own public wireless communications network that the POS device is connected to and to which the user device may also be connected in order to communicate with the POS device. Alternatively, the POS device itself may have an internal wireless router which generates the wireless network thereby forming a wireless hotspot at the merchant location. The user device may then be connected or paired directly to the wireless network provided by the POS device.

In order to further enhance security, communication between the one or more electronic processing devices and the user device may be encrypted. In one example, the digital wallet application installed on the user device may have embedded encryption that can only be decrypted by the POS device. In this way, user account information received by the POS device may be routed securely over the network and interpreted only by the POS device for use in initiating payment authorisation with the payment processing system.

As previously mentioned, the one or more electronic processing devices may be configured to cause a user interface (UI) to be displayed on the user device and to receive the indication of the transaction identifier via the user interface. In one example the user interface is a webpage displayed on the user device whilst in another example the user interface may be provided by an application executing on the user device. The application may be a merchant application, digital wallet application or it may be provided by a card network operator. Typically, the POS device will cause the UI to be displayed on the user device in response to the user device connecting or pairing with the POS device. For example, when the user connects their device with the POS device, a customized webpage may open on their device (such as a SecureCode or ecommerce site). Alternatively, the POS device may invoke an application on the client device causing a UI to be displayed to the user which allows the user to make a transaction request with the merchant by submitting a transaction identifier into the UI.

The transaction identifier typically includes at least one of information indicative of goods or services being purchased by the user, a product or service purchase code or reference number or a travel location. The type of transaction identifier used will depend upon the merchant and nature of the goods or services being purchased. For example, in a restaurant, the user may provide their table number in which case the transaction identifier would be associated with the transaction on a temporary basis. In some examples, the merchant system will store transaction identifiers (and associated payment information) in a data store for later retrieval by the POS device when a user requests payment information using a particular transaction identifier.

In an example of a ticket transaction at a train or bus station, the transaction identifier may be indicative of a desired travel destination or stop number that is provided by the user. The merchant system may have a stored list of travel destinations with associated fares based on the starting location for example which may be determined from location information determined from the POS device requesting the payment information.

In other examples, each item of goods or services supplied by a merchant may have an associated purchase code that the user enters into the UI in order to provide a transaction request to the POS device.

Typically, in response to receiving the indication of the transaction identifier, the method further includes, in the one or more electronic processing devices, providing the transaction identifier to the merchant system and receiving an indication of the payment information from the merchant system. The merchant system may be in communication with the POS device via a wired or wireless connection. The merchant system is responsive to the transaction identifier to determine payment information including at least one of a payment amount, an indication of at least one of goods and services being purchased, a bill and a ticket. For example, the merchant system may include data storage of information pertaining to supplied goods and services (or transaction identifiers) and associated price/cost which is retrieved and used to calculate a payment amount for the transaction. Having determined the payment information, the merchant system then provides the payment information to the one or more electronic processing devices. Alternatively, the merchant system may only determine the cost of each individual item of goods or services being purchased and leave the actual calculation of payment information to the POS device.

In one example, after receiving the payment information from the merchant system, the one or more electronic processing devices provide the indication of the payment information to the user device. The user device is responsive to the payment information to display a representation of the payment information to the user and determine acceptance of the payment information in accordance with user input commands. For example, a representation of the bill total or payment amount along with an indication of the goods or services purchased may be provided in the user interface displayed on the user device. Typically, the user then reviews the bill and confirms acceptance of the bill by pressing or otherwise interacting with a button or the like which will initiate the checkout or payment process. The response could also be combined with an authentication step, so that for example, provision of a PIN or other authentication information, could be taken as confirmation the transaction is to proceed.

In one example, the one or more electronic processing devices determine whether a digital wallet application is installed on the user device. In accordance with the determination, the POS device then either requests access to the digital wallet application in order to retrieve user account information or requests that the user input account information via the user interface (webpage or merchant application for example). It will be appreciated that this step may be performed at any time prior to the user initiating payment for the goods or services.

In one example, the one or more electronic processing devices may send a request to the user device to access a digital wallet application installed on the user device in order to retrieve user account information, the user device being responsive to the request to selectively provide user account information to the one or more electronic processing devices. The electronic processing devices may then receive user account information from the user device. Typically, the digital wallet application is configured to authenticate the user to selectively provide the user account information.

In this regard, the digital wallet application may prompt the user to provide authentication information, selectively authenticate the user using the authentication information and provide access to the user account information in response to successful authentication. Typically, the authentication information includes a PIN number associated with the digital wallet application, however any form of authentication information may be used including biometric information such as finger prints, a voice print, or an image of the user captured by the user device (e.g. triggered by a facial gesture of the user, such as by the user blinking). The user provides their PIN number to the digital wallet application which verifies the PIN typically at a remote server where the user security details are stored. If the PIN is verified as correct, the user is authenticated as being the owner of the digital wallet application and in response the digital wallet application provides the user account details to the POS device so that the payment authorization process can be initiated.

In one example, in response to successful payment authorization, the method further includes, in the one or more electronic processing devices, providing an indication to the user device that the payment transaction is complete, the user device being responsive to display a representation of transaction completion. A notification may be provided in the user interface on the user device confirming that the transaction was successfully completed using the provided user account information.

Finally, after the POS transaction is completed, a digital payment record indicative of the completed transaction may be generated by the POS device and provided to the user device as record of the transaction. Alternatively, the digital payment record may be generated by the merchant system and provided to the POS device which in turn transfers the digital payment record to the user device. In one example, the digital payment record is stored by the digital wallet application, however this need not be the case and the digital payment record may be stored in any suitable way on the user device.

Whilst typically the digital payment record is a digital receipt, in other examples such as when a ticket for a bus or train is being purchased, the digital payment record may be a digital ticket which the user can produce if necessary to prove that they have paid for their journey. In some examples, the digital ticket may incorporate a barcode or matrix code such as a QR code, which is readable by a suitable reader to verify the authenticity of the ticket.

An example of a system for performing a point of sale (POS) payment transaction at a merchant location will now be described with reference to FIG. 2.

In this example, the system 200 includes a POS electronic processing device 210, one or more user devices 220 running a payment application such as a digital wallet application and optionally a merchant application, a communications network 250, a merchant processing device 230, and a payment processing device 240 in communication with a database 241.

Figure 2:
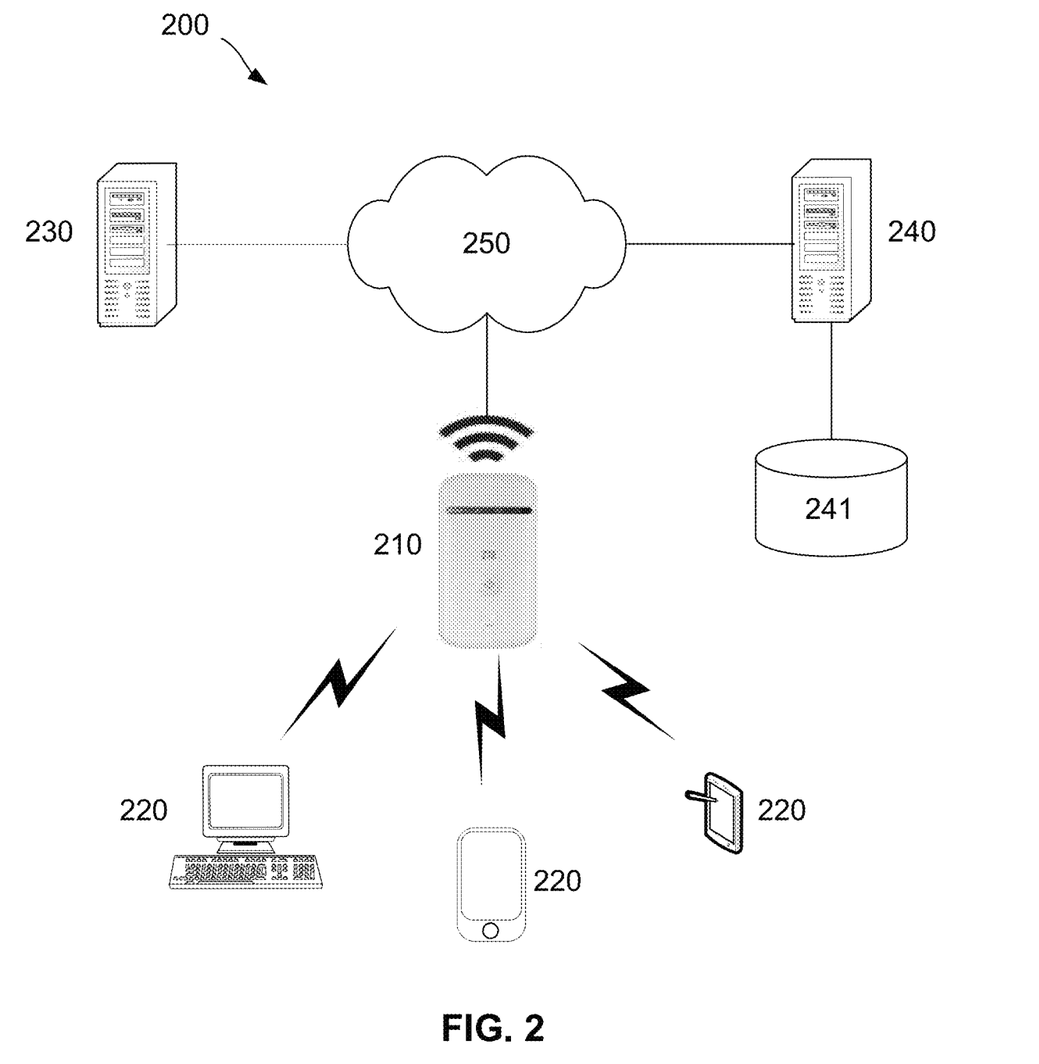
FIG. 2 is a schematic diagram of an example of a system for performing a point of sale (POS) payment transaction at a merchant location.

The communications network 250 can be of any appropriate form, such as the Internet and/or a number of local area networks (LANs) It will be appreciated that the configuration shown in FIG. 2 is for the purpose of example only, and in practice the user devices 220, POS device 210, merchant processing device 230 and payment processing device 240 can communicate via any appropriate mechanism, such as via wired or wireless connections, including, but not limited to mobile networks, private networks, such as an 802.11 network, the Internet, LANs, WANs, or the like, as well as via direct or point-to-point connections, such as Bluetooth, or the like. Typically, the one or more user devices 220 communicate with the POS device 210 via a wireless communication protocol such as Wi-Fi or Bluetooth but not limited to such. In one example, the POS device 210 includes a wireless router and provides a wireless network (e.g. Wi-Fi) to which the one or more user devices 220 are able to connect. Alternatively, the POS device 210 may be connected to a wireless network provided by a merchant to which the one or more user devices 220 may connect in order to communicate with the POS device 210.

POS Device 210

Figure 3:
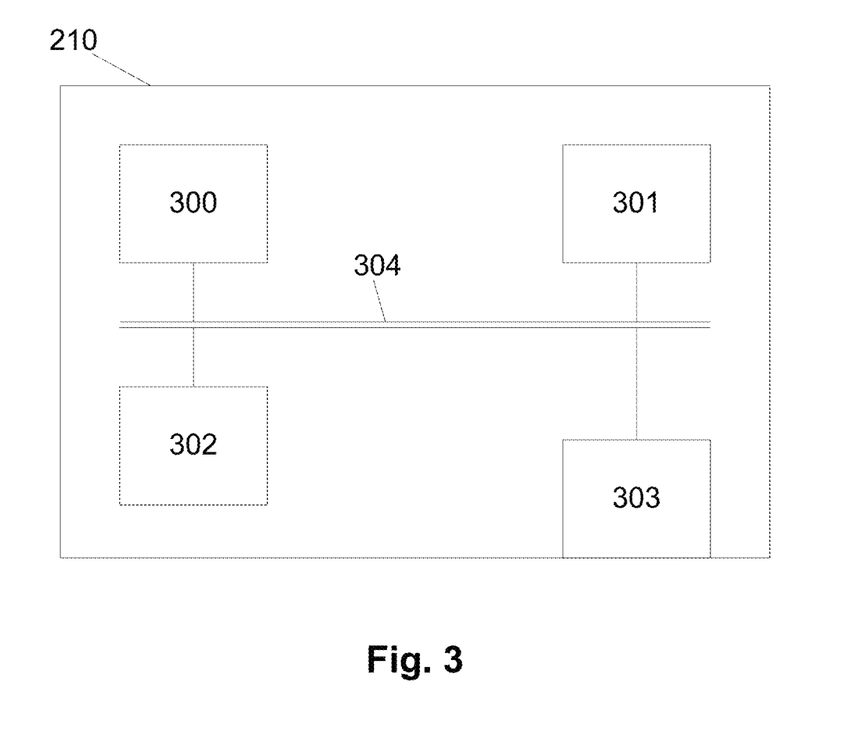
FIG. 3 is a schematic diagram showing components of an example point of sale (POS) device of the system shown in FIG. 2.

A suitable POS device for use in the system for performing a POS payment transaction described in anyone of the above examples is shown in FIG. 3.

In this example, the POS device 210 includes at least one microprocessor 300, a memory 301, an optional input/output device 302, such as a display, keyboard, touchscreen and the like, and an external interface 303, interconnected via a bus 304 as shown. In this example the external interface 303 can be utilised by the POS device 210 when communicating with peripheral devices, such as the user device 220, communications networks, payment processing device 230, merchant processing device 240, databases, other storage devices, or the like. Although only a single interface 303 is shown, this is for the purpose of example only, and in practice multiple interfaces using various methods (e.g. Ethernet, serial, USB, wireless, Bluetooth™ Low Energy (BLE), Near Field Communication (NFC), or the like) may be provided.

In use, the microprocessor 300 executes instructions in the form of applications software stored in the memory 301 to allow communication with the user device 220, for example to receive a transaction request, the merchant processing device 240, for example to receive payment information, and the payment processing device 230, for example to initiate payment authorization. The applications software may include one or more software modules, and may be executed in a suitable execution environment, such as an operating system environment, or the like.

Accordingly, it will be appreciated that the POS device 210 may be formed from any suitable processing system, such as any electronic processing device, including a microprocessor, microchip processor, logic gate configuration, firmware optionally associated with implementing logic such as an FPGA (Field Programmable Gate Array), or any other electronic device, system or arrangement. However, the POS device 210 may also be formed from a suitably programmed PC, Internet terminal, lap-top, or hand-held PC, a tablet, or smart phone, or the like. Thus, in one example, the processing system 210 is a standard processing system such as an Intel Architecture based processing system, which executes software applications stored on non-volatile (e.g., hard disk) storage, although this is not essential.

User Device 220

Figure 4:
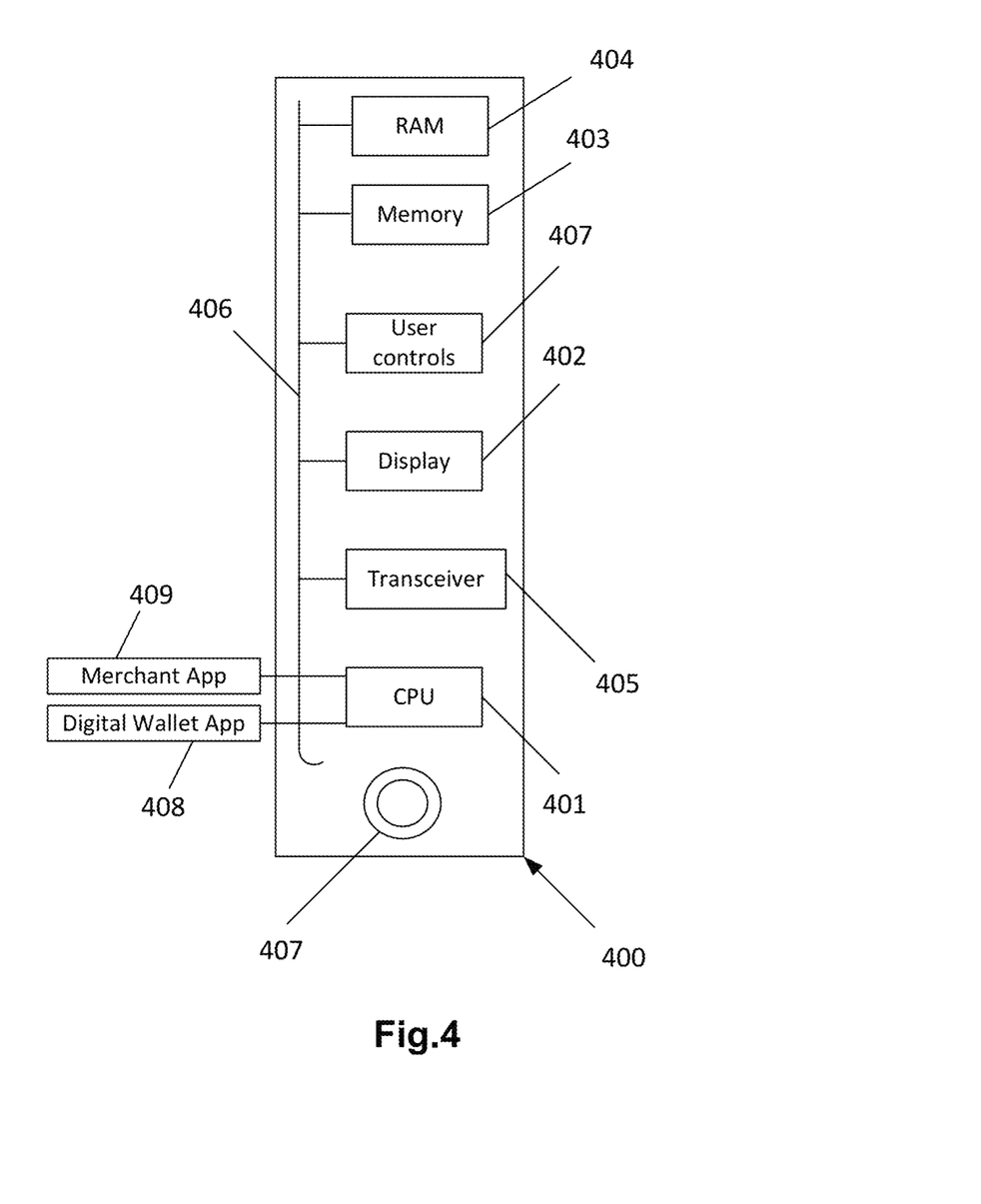
FIG. 4 is a schematic diagram showing components of an example user device of the system shown in FIG. 2.

The user device 220 of any of the examples herein may be a handheld computer device such as a smart phone or a PDA such as one manufactured by Apple™, LG™, HTC™, Research In Motion™, or Motorola™. The user device 220 may include a mobile computer such as a tablet computer. An exemplary embodiment of a user device 400 is shown in FIG. 4. As shown, the device 400 includes the following components in electronic communication via a bus 406:

1. a display 402;
2. non-volatile memory 403;
3. random access memory ("RAM") 404;
4. N processing components 401;
5. a transceiver component 405 that includes N transceivers; and
6. user controls 407.

Although the components depicted in FIG. 4 represent physical components, FIG. 4 is not intended to be a hardware diagram; thus many of the components depicted in FIG. 4 may be realized by common constructs or distributed among additional physical components. Moreover, it is certainly contemplated that other existing and yet-to-be developed physical components and architectures may be utilized to implement the functional components described with reference to FIG. 4.

The display 402 generally operates to provide a presentation of content to a user, and may be realized by any of a variety of displays (e.g., CRT, LCD, HDMI, micro-projector and OLED displays). And in general, the non-volatile memory 403 functions to store (e.g., persistently store) data and executable code including code that is associated with the functional components of a browser component and applications, and in one example, the payment application (digital wallet application) 408 and optionally a merchant application 409. In some embodiments, for example, the non-volatile memory 403 includes bootloader code, modem software, operating system code, file system code, and code to facilitate the implementation of one or more portions of the payment application 408 as well as other components well known to those of ordinary skill in the art that are not depicted for simplicity.

In many implementations, the non-volatile memory 403 is realized by flash memory (e.g., NAND or ONENAND memory), but it is certainly contemplated that other memory types may be utilized as well. Although it may be possible to execute the code from the non-volatile memory 403, the executable code in the non-volatile memory 603 is typically loaded into RAM 404 and executed by one or more of the N processing components 401.

The N processing components 401 in connection with RAM 404 generally operate to execute the instructions stored in non-volatile memory 403 to effectuate the functional components. As one of ordinarily skill in the art will appreciate, the N processing components 401 may include a video processor, modem processor, DSP, graphics processing unit (GPU), and other processing components.

The transceiver component 405 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Merchant Processing Device 230 and Payment Processing Device 240

Figure 5:
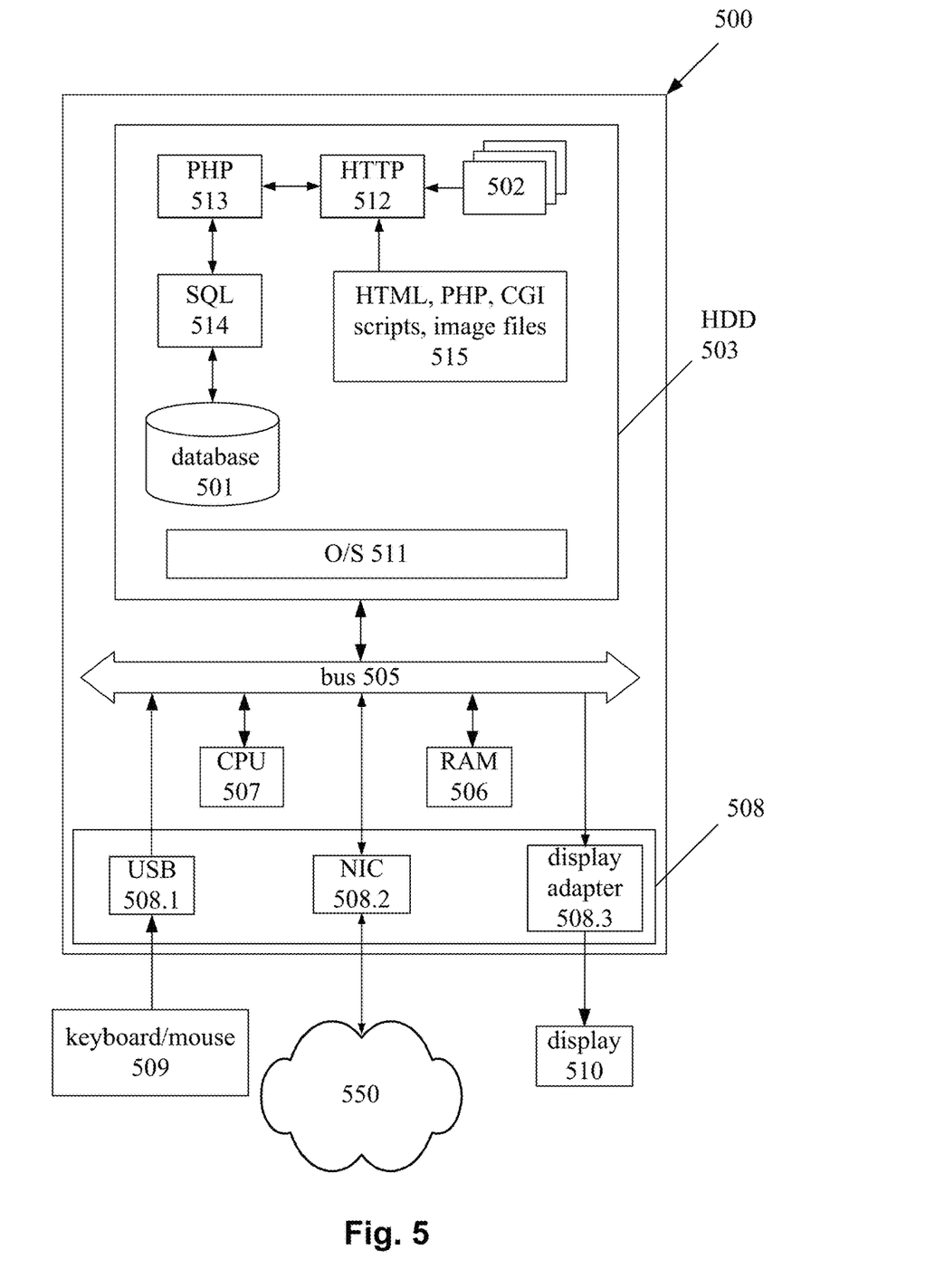
FIG. 5 is a schematic diagram showing components of an example merchant processing device of the system shown in FIG. 2.

The merchant processing device 230 and the payment processing device 240 of any of the examples herein may be formed of any suitable processing device, and one such suitable device is shown in FIG. 5.

In this example, a processing device is provided by a server 500 in communication with a database 501, as shown in FIG. 5. The computer system 500 is able to communicate with the POS device 210, client device 220, the payment processing device 240 and/or merchant processing device 230, and/or other processing devices, as required, over a communications network 550 using standard communication protocols.

The components of the processing system 500 can be configured in a variety of ways. The components can be implemented entirely by software to be executed on standard computer server hardware, which may comprise one hardware unit or different computer hardware units distributed over various locations, some of which may require the communications network 550 for communication. A number of the components or parts thereof may also be implemented by application specific integrated circuits (ASICs) or field programmable gate arrays.

In the example shown in FIG. 5, the processing system 500 is a commercially available server computer system based on a 32 bit or a 54 bit Intel architecture, and the processes and/or methods executed or performed by the computer system 500 are implemented in the form of programming instructions of one or more software components or modules 502 stored on non-volatile (e.g., hard disk) computer-readable storage 503 associated with the computer system 500. At least parts of the software modules 502 could alternatively be implemented as one or more dedicated hardware components, such as application-specific integrated circuits (ASICs) and/or field programmable gate arrays (FPGAs).

The computer system 500 includes at least one or more of the following standard, commercially available, computer components, all interconnected by a bus 505:

1. random access memory (RAM) 506;
2. at least one computer processor 507, and
3. external computer interfaces 508:
   a. universal serial bus (USB) interfaces 508.1 (at least one of which is connected to one or more user-interface devices, such as a keyboard, a pointing device (e.g., a mouse 509 or touchpad),
   b. a network interface connector (NIC) 808.2 which connects the computer system 500 to a data communications network, such as the Internet 550; and
   c. a display adapter 508.3, which is connected to a display device 510 such as a liquid-crystal display (LCD) panel device.

The computer system 500 includes a plurality of standard software modules, including:

1. an operating system (OS) 511 (e.g., Linux or Microsoft Windows);
2. web server software 512 (e.g., Apache, available at http://www.apache.org);
3. scripting language modules 513 (e.g., personal home page or PHP, available at http://www.php.net, or Microsoft ASP); and
4. structured query language (SQL) modules 514 (e.g., MySQL, available from http://www.mysql.com), which allow data to be stored in and retrieved/accessed from an SQL database5.

Together, the web server 512, scripting language 513, and SQL modules 514 provide the computer system 500 with the general ability to allow users of the Internet 550 with standard computing devices equipped with standard web browser software to access the computer system 500 and in particular to provide data to and receive data from the database 501. It will be understood by those skilled in the art that the specific functionality provided by the system 500 to such users is provided by scripts accessible by the web server 512, including the one or more software modules 502 implementing the processes performed by the computer system 500, and also any other scripts and supporting data 515, including markup language (e.g., HTML, XML) scripts, PHP (or ASP), and/or CGI scripts, image files, style sheets, and the like.

The boundaries between the modules and components in the software modules 502 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the steps of the processes performed by the computer system 500 may be executed by a module (of software modules 502) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computer system 500 normally processes information according to a program (a list of internally stored instructions such as a particular application program and/or an operating system) and produces resultant output information via input/output (I/O) devices 508. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

In other examples, such as described above, the payment processing system is formed of multiple computer systems interacting, for example, via a distributed network arrangement. As distributed networking is known in the art, it will not be described further in more detail.

Figure 6A:
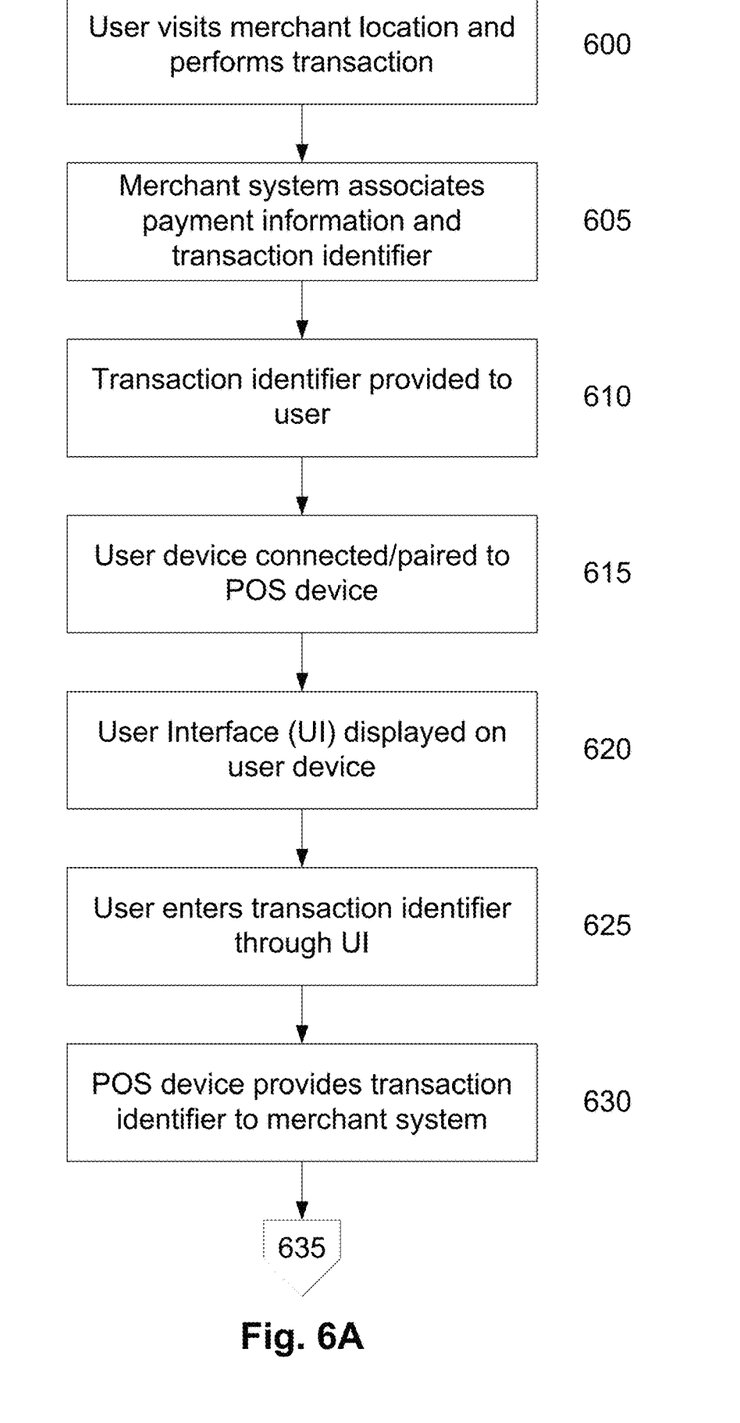
FIGS. 6A to 6C is a flowchart of a specific example of a method of performing a point of sale (POS) payment transaction at a merchant location; and, FIG. 7 is a flowchart illustrating a specific example of a method of performing a POS transaction between a user and merchant.
Figure 6B:
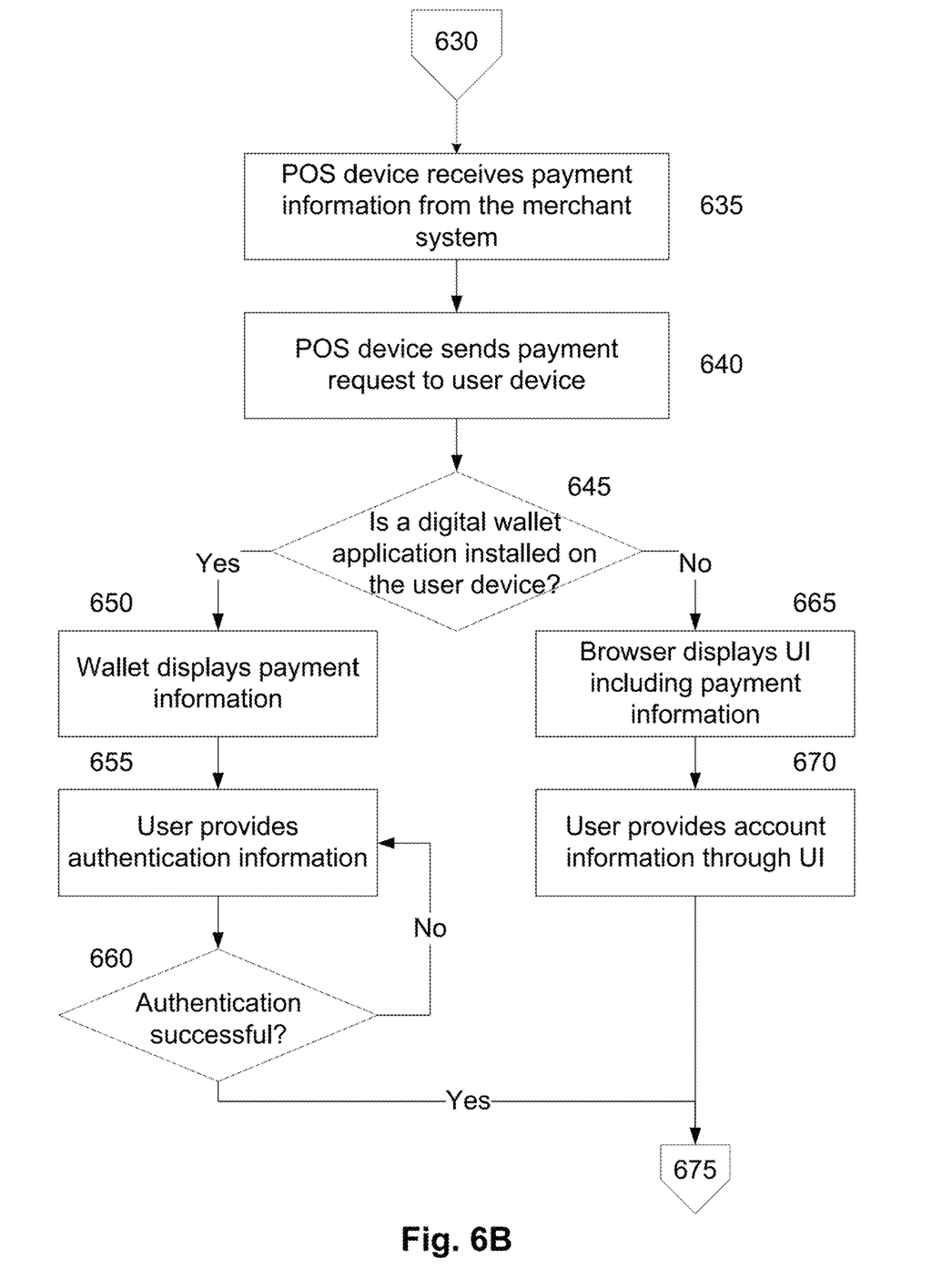
Figure 6C:
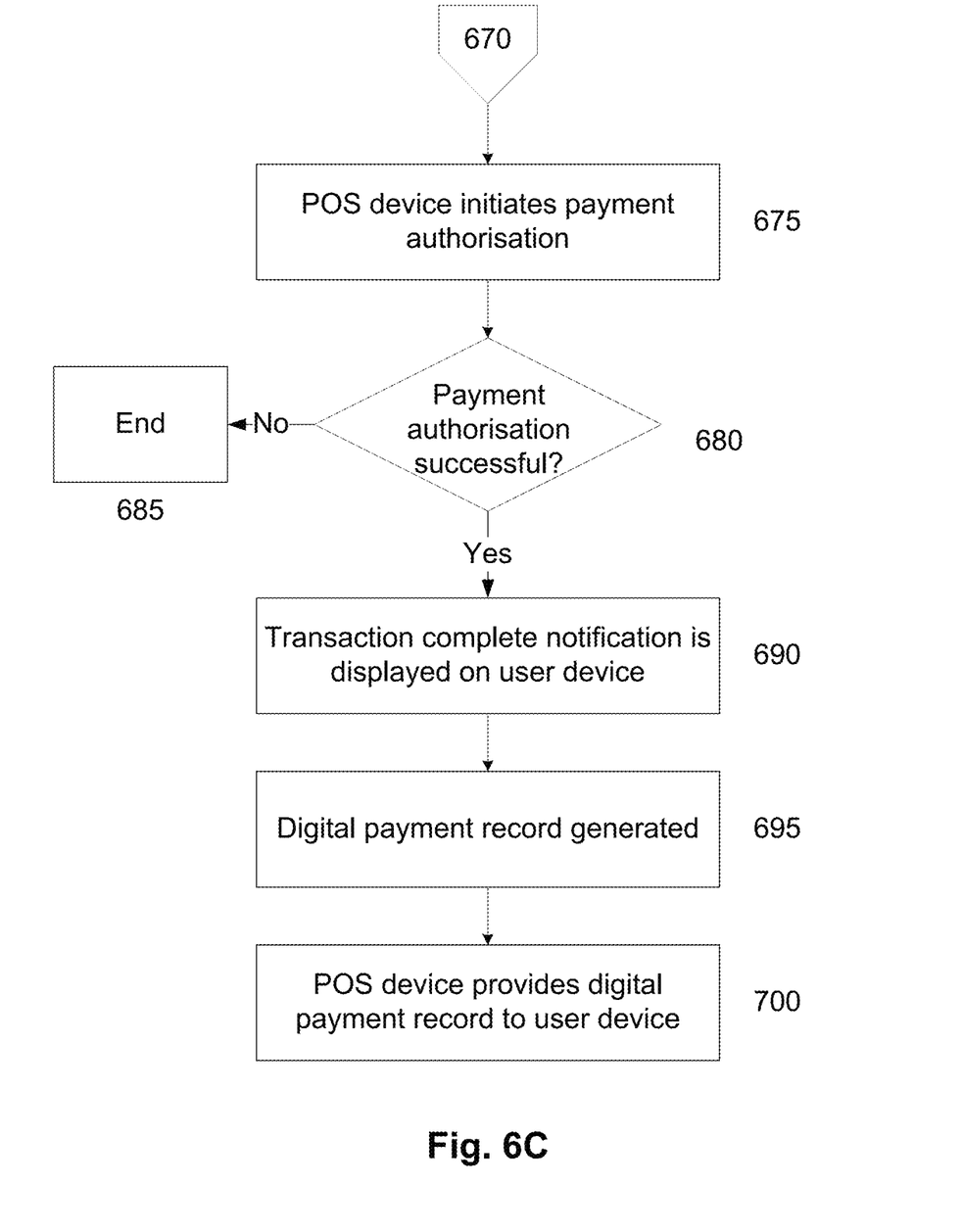

To illustrate further features of preferred practical implementations of the method, a further detailed example of a method of performing a point of sale (POS) payment transaction at a merchant location will now be described with reference to FIGS. 6A-6C.

At step 600, a user visits a merchant location in order to perform a transaction involving the purchase of goods and/or services provided by the merchant. The merchant location may take any suitable form and may include for example a store or retail outlet, restaurant, bar or café or a train or bus station. The merchant location may be any location where a POS transaction is performed between a consumer and a merchant.

At step 605, the merchant processing system 230 is used in creating payment information and associating this with a transaction identifier. This process is typically performed as part of the transaction process, and could include for example having the merchant calculate an amount payable either manually, by scanning items for purchase or the like. The transaction identifier could then be generated and/or retrieved, before being associated with the respective transaction information. For example, the transaction identifier could be based on an identifier of merchant processing system, such as a POS terminal number, or could be indicative of an identifier such as a table number, and then re-used each time a transaction is performed. Alternatively, the transaction identifier is unique for each transaction.

At step 610, the transaction identifier is provided to the user. This can be achieved manually, by having the merchant tell the user, or by displaying the transaction identifier, for example by providing the user a receipt with the transaction identifier provided thereon, by presenting this on a display of the merchant processing device, or the like.

At step 615, the user device is connected or paired to a POS electronic processing device provided at the merchant location. As previously described, the POS device typically creates a wireless hotspot enabling one or more user devices to connect or pair to it via a suitable communications protocol such as Wi-Fi or Bluetooth, although any other suitable wireless protocol may be used which allows communication between the devices. Typically, the user will be able to connect or pair their device (such as a mobile phone, laptop, tablet etc.) to the POS device from anywhere within the premises at the merchant location. If the user has been to the merchant previously, then step 615 may occur automatically when the user enters the merchant location as the user's device will automatically pick up the wireless network provided by the POS device and connect thereto. However, if the user has not previously been to the merchant location, then they may need to initially request to join the network or pair with the POS device and input any necessary credentials such as a username and password if required. In any event, it will also be appreciated from this that this step could occur before the transaction is performed, and reference to the particular order of steps is not intended to be limiting.

In response to the user device connecting or pairing with the POS device, the POS device causes a user interface (UI) to be displayed on the user device at step 620. In one example, the POS device causes a webpage (such as a customized merchant shopping page or website operated by a card network) to be displayed on the user device. Alternatively, the POS device may invoke an application executing on the user device causing the application to display a UI to the user that may for instance allow the user to enter a transaction request with the merchant.

At step 625, the user enters a transaction identifier through the UI displayed on their device. As previously mentioned, the transaction identifier may include for instance a reference number (such as a table number in a restaurant), a purchase code for the particular goods or services or a travel destination in the situation where a bus or train ticket is being purchased for instance.

Whilst in this example the merchant processing system 230 associates a transaction identifier with payment information (for example, in a restaurant scenario, it may be Table 4 is associated with a bill of $90) prior to the user interacting with the POS device, in other examples this may not be the case. For example, the user may connect with the POS device, and then be presented with a user interface of available goods/services to purchase. The user may then select particular goods/services and submit the selection to the POS device before a merchant system is even involved in the transaction.

At step 630, the POS device then provides the transaction identifier to a merchant system for use in determining an amount payable (i.e. a bill) for the transaction between the user and merchant. The merchant system may include a data store containing cost data for goods and services provided by the merchant. The POS device may query the merchant data store to obtain the relevant cost data for use in calculating the total bill. Alternatively, the POS device may simply retrieve the payment information from the merchant system that has already been associated with a specific transaction identifier.

At step 635, the POS device receives payment information from the merchant system which may include the total bill or payment amount or alternatively be indicative of the individual item costs with the amount payable calculation then performed by the POS device. The POS device then sends a payment request to the user device at step 640, allowing the user to authorise the transaction and provide account information.

In this regard, the payment information may be displayed on the user device, for example through the webpage or application executing on the user device.

Typically, the user then accepts the bill and indicates that they wish to proceed with the payment transaction. At step 640, the POS device determines whether a digital wallet application (such as MasterPass by Mastercard, or a digital wallet application of a bank or other issuer) is installed on the user device.

If it is determined that the user is registered to a digital wallet application at step 645, then at step 650, the user device displays payment information and the digital wallet application provides the account information to the POS device. In order for this to occur, the user is typically required to authenticate this request by providing authentication information at step 655, with this being used by the digital wallet application to authenticate the user.

Thus, in one example, the user receives a message on their device notifying them that the POS device has requested access to their digital wallet application and asking them to provide a PIN number to allow the POS device permission to access their personal account information. However, it will be appreciated that other authentication information, such as biometric information or the like may be used. The account information may be stored locally on the user device or stored remotely on a wallet server (not shown) in communication with the digital wallet application. In this latter case, the PIN number will also typically be stored on the remote server such that when the user enters their PIN number, the POS device determines whether authentication is successful via communication with the digital wallet server. If the correct PIN is provided, the digital wallet server will provide an indication to the POS device that the user authentication was successful and in response, the POS device will obtain the user account information from the digital wallet application.

Alternatively, if the user is not registered to a digital wallet application, at step 665, the user device displays a UI including the payment information, which is used to prompt the user to provide account information (such as credit or bank card details) through the user interface (such as a merchant shopping webpage). At step 670 the user provides the account information through the user interface in a similar manner to how a standard ecommerce transaction is performed with a merchant.

Irrespective of the technique used, after having received the user account information, the POS device then initiates payment authorisation at step 675 in the standard manner that normal POS devices do as is well known in the art. In one example, the POS device sends the user account information and payment information to the merchant's acquirer. The acquirer then requests that the card network obtain an authorization from the user's issuing bank. The card network submits the transaction to the issuer for authorization and the issuing bank then authorizes the transaction if the account has sufficient funds to cover the amount payable. The issuer then routes payment to the acquirer who then deposits the payment into the merchant's account.

At step 680, the POS device determines whether payment authorisation was successful, and if not the process ends at step 685. Otherwise, an indication that the transaction was successful will be provided to the POS device from the issuer or acquirer, and possibly via a payment gateway. The POS device then causes a transaction complete notification to be displayed on the user device through the user interface (merchant webpage or application) at step 690. A digital payment record is then generated (e.g. receipt, ticket etc.) at step 695 and provided to the user device at step 700. The digital payment record may be displayed via the user interface and stored by the merchant system or alternatively it may be stored by the digital wallet application for later retrieval or access. Whilst the POS device may generate the digital payment record, this may alternatively be performed by the merchant system which then provides the payment record to the POS device.

Figure 7:
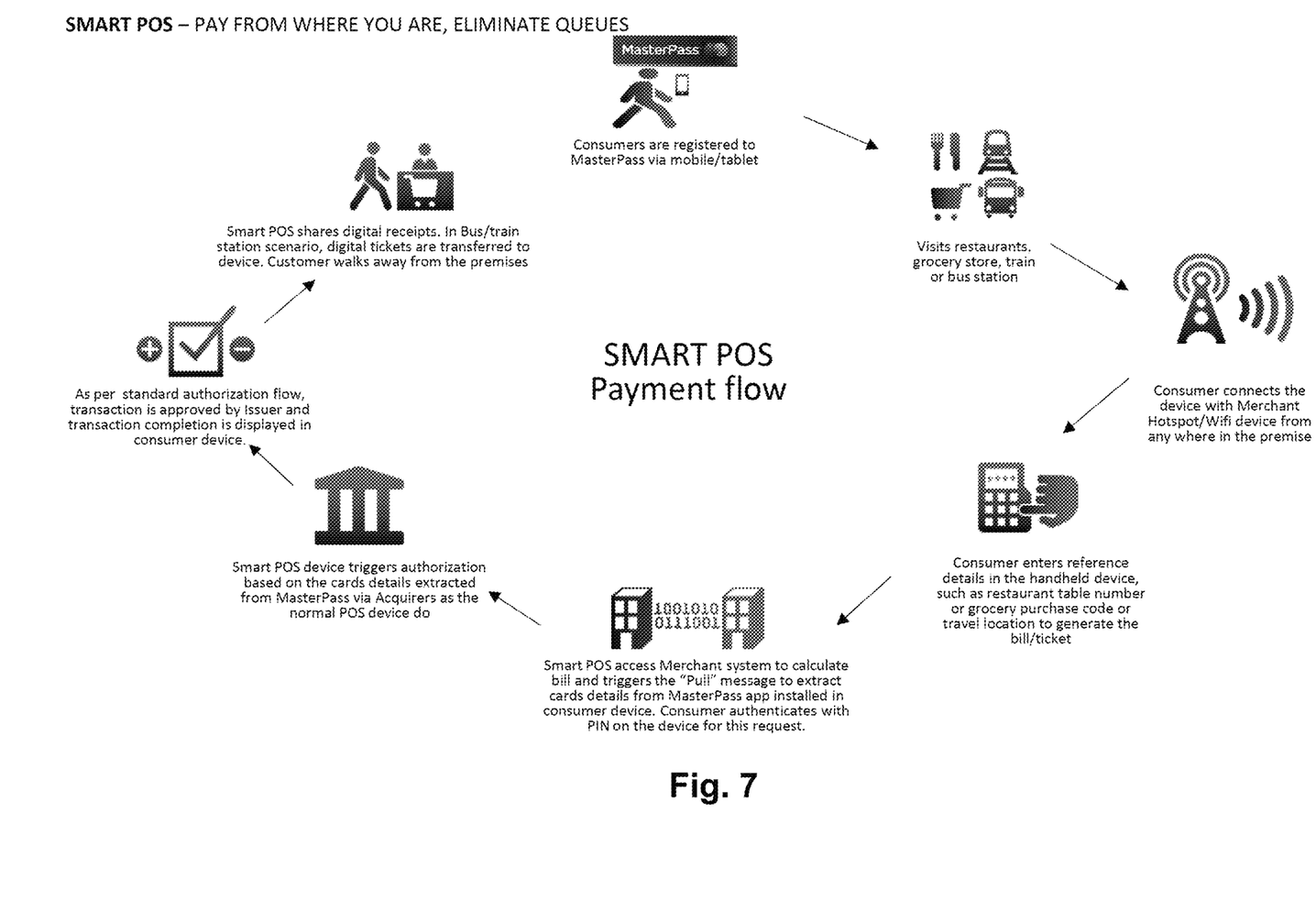

A specific example of payment flow of a POS transaction between a consumer and a merchant is shown in FIG. 7.

In this example, a consumer installs a digital wallet application (such as Masterpass) onto their mobile device (phone, tablet etc.). This step may occur at any time before a transaction with a merchant is conducted. The consumer then visits a merchant (such as a restaurant, grocery store, train or bus station) and connects their device with the merchant hotspot/Wi-Fi device (POS device) from anywhere in or near (provided they are in range) the merchant premises. The consumer is then provided with a user interface on their device (e.g. a merchant application may provide the interface or alternative a shopping web page may be served to the consumer's mobile device) which is used to enter reference details indicative of the goods or services being purchased from the merchant. For example, the user may enter a restaurant table number, grocery purchase code or travel location.

The reference details for the transaction are submitted to the POS device which provides the transaction information to a merchant system to calculate the payment information (i.e. bill). A message (for example a pull message) is then sent to the consumer's device providing the payment information and requesting access to the digital wallet application installed on the consumer device in order to extract payment card details. This request is authenticated by the consumer for example by providing a PIN number associated with the digital wallet application.

After having received the payment card details from the digital wallet application, the POS device initiates payment authorization via a merchant acquirer in accordance with standard authorization processes known in the art of POS payment processing. If sufficient funds are available in the consumer's bank account to cover the transaction, the transaction is approved by an issuing bank and funds are routed from the issuer to the acquirer. The POS device then provides notification to the consumer that the transaction has been approved/completed and causes digital receipts and/or tickets to be provided to the consumer's mobile device.

Accordingly, it will be appreciated that in at least one example the above described system provides a more convenient and secure point of sale transaction between a consumer and a merchant at a merchant location. The ability to "pay from where you are" at a merchant location removes the need to conduct the transaction at a centralized POS location and thereby eliminates the need to ever queue up at a checkout counter or ticket machine for example. Transactions can thereby be conducted faster and without requiring a merchant employee to facilitate the POS transaction. The ability to pay for goods and services without needing to present a physical payment card and authentication information at a POS terminal provides a simpler and more secure means of conducting a POS transaction.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method of performing a point of sale (POS) payment transaction at a merchant location, the method including, in one or more electronic processing devices:
   receiving, by a point of sale (POS) device, a transaction request including an indication of a transaction identifier from a user device;
   retrieving, by the POS device, an indication of payment information from a merchant system using the transaction identifier;
   determining, by the POS device, that a digital wallet is installed on the user device;
   transmitting, by the POS device to the user device, a request for user authentication information to obtain access to user account information stored by the digital wallet;
   receiving, by the POS device from the user device, the user authentication information;
   transmitting, by the POS device to a wallet server, the user authentication information;
   receiving, by the POS device from the wallet server, an indication of successful user authentication and the user account information; and,
   initiating, by the POS device, payment authorization with a payment processing system using the payment information and the user account information to enable the payment transaction to be performed.

2. A method as claimed in claim 1, wherein the one or more electronic processing devices communicate with the user device via a wireless communication protocol.

3. A method as claimed in claim 2, wherein communication between the one or more electronic processing devices and the user device is encrypted.

4. A method as claimed in claim 1, wherein the method further includes, in the one or more electronic processing devices:
   causing a user interface to be displayed on the user device; and,
   receiving the indication of the transaction identifier via the user interface.

5. A method as claimed in claim 4, wherein the user interface is a webpage or an application executing on the user device.

6. A method as claimed in claim 4, wherein the transaction identifier includes at least one of:
   information indicative of goods or services being purchased by the user;
   a product or service purchase code;
   a product or service reference number; and;
   a travel location.

7. A method as claimed in claim 1, wherein in response to receiving the indication of the transaction identifier, the method further includes, in the one or more electronic processing devices:
   providing the transaction identifier to the merchant system, the merchant system being responsive to the transaction identifier to:
   i) determine payment information including at least one of:
      (1) a payment amount;
      (2) an indication of at least one of goods and services being purchased;
      (3) a bill; and,
      (4) a ticket; and,
   ii) provide the payment information to the one or more electronic processing devices; and,
   receiving an indication of the payment information from the merchant system.

8. A method as claimed in claim 7, wherein the method further includes providing the indication of the payment information to the user device, the user device being responsive to the payment information to:
   display a representation of the payment information to the user; and,
   determine acceptance of the payment information in accordance with user input commands.

9. A method as claimed in claim 1, wherein in response to successful payment authorization, the method further includes, in the one or more electronic processing devices, providing an indication to the user device that the payment transaction is complete, the user device being responsive to display a representation of transaction completion.

10. A method as claimed in claim 9, wherein the method further includes, in the one or more electronic processing devices:
   generating a digital payment record indicative of the completed transaction; and,
   providing the digital payment record to the user device.

11. A method as claimed in claim 10, wherein the digital payment record includes at least one of:
   a digital receipt; and,
   a digital ticket.

12. A method according to claim 1, wherein the user account information is received from the user via input into the user interface displayed on the user device.

13. A system for performing a point of sale (POS) payment transaction at a merchant location, the system including a POS device capable of establishing a wireless connection with a user device, the POS device configured to:
   receive a transaction request including an indication of a transaction identifier from a connected user device, the transaction identifier indicative of goods or services being purchased by a user from a merchant;
   retrieve an indication of payment information from a merchant system using the transaction identifier;
   provide the payment information to the user device;
   determine that a digital wallet is installed on the user device;
   transmit a request to the user device for user authentication information to obtain access to user account information stored by the digital wallet;
   receive the user authentication information from the user device;
   transmit the user authentication information to a wallet server;
   receive an indication of successful user authentication and the user account information from the wallet server; and,
   initiate payment authorization with a payment processing system using the payment information and the user account information to enable the payment transaction to be performed.

14. A system according to claim 13, wherein the POS device is capable of establishing a wireless connection with multiple user devices in order to simultaneously execute multiple payment transactions with the merchant.

15. A system according to claim 13, wherein the POS device includes a wireless router.

16. A system according to claim 13, wherein the wireless connection is established using Wi-Fi or Bluetooth communication protocols.

* * * * *